United States Patent [19]
Chen et al.

[11] Patent Number: 5,664,082
[45] Date of Patent: Sep. 2, 1997

[54] METHOD AND APPARATUS FOR ARBITRARY TRANSFORMATION OF IMAGES

[75] Inventors: Kok S. Chen, Sunnyvale; Marilyn Chen, Atherton, both of Calif.

[73] Assignee: Apple Computer, Inc., Cupertino, Calif.

[21] Appl. No.: 471,211

[22] Filed: Jun. 6, 1995

[51] Int. Cl.$^6$ .................................................. G06F 15/00
[52] U.S. Cl. .................................................. 345/436
[58] Field of Search ...................... 395/136, 137, 395/138, 139; 345/126, 127

[56] References Cited

U.S. PATENT DOCUMENTS

| | | | |
|---|---|---|---|
| 4,929,085 | 5/1990 | Kajihara | 364/518 |
| 4,930,088 | 5/1990 | Horiguchi | 364/518 |
| 4,985,849 | 1/1991 | Hideaki | 364/518 |
| 5,067,167 | 11/1991 | Berger | 382/46 |
| 5,081,700 | 1/1992 | Crozier | 395/150 |
| 5,491,778 | 2/1996 | Gordon et al. | 395/133 |

OTHER PUBLICATIONS

Foley, J.D., et al., "Computer Graphics, Principles and Practice", Second Edition, Addison–Wesley Publishing Company; Reading, Mass.; 1990.
A.W. Paeth, "A Fast Algorithm for General Raster Rotation" in Graphics Gems; A.S. Glassner, ed., Academic Press; Boston, Mass.; 1990.

*Primary Examiner*—Phu K. Nguyen
*Attorney, Agent, or Firm*—Nancy R. Simon

[57] ABSTRACT

A method and apparatus for arbitrary transformation of images comprises a transformation between a source image and a destination image. Variables which define the transformation are obtained. A first value and a second value are then determined from the variables. An initial pixel is initialized and destination vectors are determined for the initial pixel. For each remaining pixel to be transformed, the first value is added to the x component and the second value is added to the y component of the destination vectors that correspond to the pixel being transformed. The method and apparatus for arbitrary transformation of images thereby reduces the number of calculations that need to be performed for such operations to two additions only.

19 Claims, 4 Drawing Sheets

METHOD AND APPARATUS FOR ARBITRARY TRANSFORMATION OF IMAGES

BACKGROUND OF THE INVENTION

1. Field of the Invention

The present invention relates generally to image processing, and more particularly to transforming images. Still more particularly, the present invention relates to a method and apparatus for arbitrary transformation of images.

2. Description of the Prior Art

Image processing operations such as rotation, skewing, creating perspective views and scaling are widely used and well known in the art. Transforming one image into a second image typically requires an image processing apparatus, such as a computer, to perform a variety of computations. These computations can include multiplications and additions. But performing multiplication is generally a time consuming process that slows down the transformation process.

Therefore it is desirable to reduce the number of computations, particularly the time consuming computations like multiplications, when transforming images. One technique of reducing the number of computations is disclosed in U.S. Pat. No. 5,295,237 entitled "Image Rotation Method and Image Rotation Processing Apparatus" by Park. In Park, the type of computations required for rotating an image are reduced to addition operations only, thereby eliminating the need for a floating point multiplier.

The technique disclosed in Park, however, is limited to rotating images through a specified angle, where the rotated image is of the same scale as the original image. Two variables, n and m, are derived from the same independent variable, theta, through the mathematical operations of cos (theta) and sin (theta), respectively. Therefore, other types of image processing operations, such as scaling or skewing, are not considered or discussed in Park, and can not be performed using the technique described in Park.

Therefore, it is desirable to have a more flexible method to transform images, where any image processing operation can be performed with increased speed and efficiency. It is also desirable that the more flexible image transformation method not significantly increase the cost of an image processing apparatus.

SUMMARY OF THE INVENTION

A method and apparatus for arbitrary transformation of images comprises a transformation between a source image and a destination image. The source and destination images are preferably comprised of raster lines. Variables which define the transformation are obtained. A first value and a second value are then determined from the variables. Using inverse mapping in the preferred embodiment, an initial pixel in a first raster line in the destination image is selected and destination vectors are determined for the initial pixel. For each pixel remaining in the first raster line, the first value is added to the x component and the second value is added to the y component of the destination vectors that correspond to the pixel being transformed. When the end of the first raster line is reached, the raster line is incremented and the process continues until the entire image has been transformed. Since the first and second values will not change for a particular transformation in the preferred embodiment, those values need to be computed only once. In this manner the number of computations required to transform an image is reduced from four multiplications and two additions to just two additions.

BRIEF DESCRIPTION OF THE DRAWINGS

The novel features believed characteristic of the invention are set forth in the appended claims. The invention itself, however, as well as a preferred mode of use, and further objects and advantages thereof, will best be understood by reference to the following detailed description of an illustrative embodiment when read in conjunction with the accompanying drawings, wherein:

DESCRIPTION OF THE PREFERRED EMBODIMENT

Figure 1:
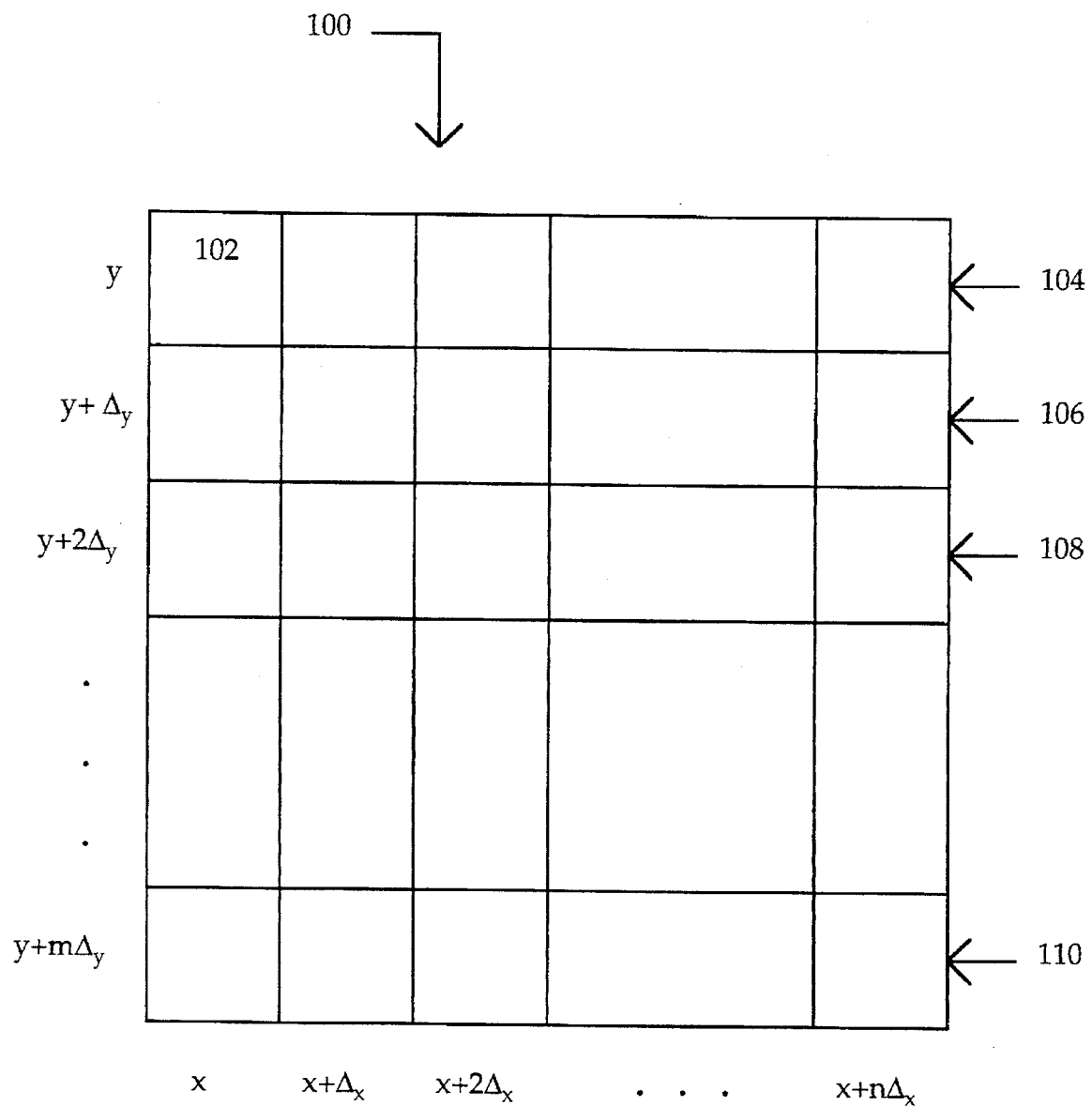
FIG. 1 depicts a two dimensional image that is used to describe a preferred method for arbitrary transformation of images according to the present invention.

With reference now to the figures and in particular with reference to FIG. 1, a two dimensional image is depicted that will be used to describe a method for arbitrary transformation of images according to the present invention. As known in the art, image 100 is made up of a plurality of discrete picture elements, or pixels. Each pixel in image 100 can have a different attribute associated with it, such as color or gray tones. It is common to express the location of a pixel in image 100 as a position within a two-dimensional Cartesian coordinate system. For example, pixel 102 is located at the position (x, y).

Image 100 is comprised of a plurality of horizontal lines 104, 106, 108, 110, known as raster lines. In raster image processing, image 100 is scanned out sequentially one raster line at a time, typically beginning at the top of image 100 with horizontal line 104 and pixel 102.

Each raster line is stored, retrieved and/or transmitted in successive samples, i.e. the pixels are presented such that their positions are in the order $(x, y)$, $(x+\Delta_x, y)$, $(x+2\Delta_x, y)$, ..., $(x+n\Delta_x, y)$ for a known fixed value of $\Delta_x$. After operating on all of the pixels in line y, the value y is updated to the next successive line, $y+\Delta_y$. The pixels on that line are then presented in the order $(x, y+\Delta_y)$, $(x+\Delta_x, y+\Delta_y)$, $(x+2\Delta_x, y+\Delta_y)$, ..., $(x+n\Delta_x, y+\Delta_y)$ for a known fixed value of $\Delta_y$. This continues until the last line in image 100 is presented in the order $(x, y+m\Delta_A)$, $(x+\Delta_x, y+m\Delta_y)$, $(x+2\Delta_x, y+m\Delta_y)$, ..., $(x+n\Delta_x, y+m\Delta_y)$. Those skilled in the art will appreciate that $\Delta_x$ and $\Delta_y$ may be the same or different values. Furthermore, $\Delta_x$ and $\Delta_y$ can be integer and/or non-integer numbers.

Typically the position and dimension of each pixel in a source image is manipulated in order to create a destination image. A common means of expressing this is through matrix algebra, where (x, y) is the position of a pixel in the source image and (x', y') is the position of a pixel in the destination image. The variables a, b, c, d are values which define the transformation.

$$\begin{bmatrix} x' \\ y' \end{bmatrix} = \begin{bmatrix} a & b \\ c & d \end{bmatrix} \begin{bmatrix} x \\ y \end{bmatrix}$$

The present invention will now be described using the above matrix algebra formula. It should be noted that the present invention is not limited to matrix computations. In general, the destination vectors need only be linear combinations of the source vectors.

The initial raster line begins with an initial pixel located at an origin position ($x_0$, $y_0$). In FIG. 1, pixel 102 is the initial pixel, and its position (x, y) is the origin position. Using the variables a, b, c, d as the values that define the transformation, the corresponding destination position ($x'_0$, $y'_0$) can be computed using the following matrix equation:

$$\begin{bmatrix} x'_0 \\ y'_0 \end{bmatrix} = \begin{bmatrix} a & b \\ c & d \end{bmatrix} \begin{bmatrix} x_0 \\ y_0 \end{bmatrix} \quad (1)$$

The next pixel to be transformed is located at the position ($x_0 + \Delta_x$, $y_0$). In the preferred embodiment, $\Delta_x$ is a known, fixed value, and can be an integer or a non-integer number. The corresponding destination position for this pixel is computed using the matrix equation:

$$\begin{bmatrix} x' \\ y' \end{bmatrix} = \begin{bmatrix} a & b \\ c & d \end{bmatrix} \begin{bmatrix} x_0 + \Delta_x \\ y_0 \end{bmatrix} \quad (2)$$

Using the properties of matrix algebra, equation (2) can be written as such:

$$\begin{bmatrix} x' \\ y' \end{bmatrix} = \begin{bmatrix} a & b \\ c & d \end{bmatrix} \begin{bmatrix} x_0 \\ y_0 \end{bmatrix} + \begin{bmatrix} a & b \\ c & d \end{bmatrix} \begin{bmatrix} \Delta_x \\ 0 \end{bmatrix} \quad (3)$$

Note, however, that the first term following the equal sign is the equation used to calculate ($x'_0$, $y'_0$), or equation (1). Rewriting equation (3), the computations of (x', y') for each pixel in the raster line can be calculated using the following two equations:

$$x' = x'_0 + a\Delta_x \quad (4)$$
$$y' = y'_0 + c\Delta_x \quad (5)$$

Thus, when destination vectors ($x'_0$, $y'_0$) are known for a pixel, new destination vectors can be determined by adding a first value ($a\Delta_x$) to the x component of the vector and adding a second value ($c\Delta_x$) to the y component of the vector. Since the first and second values will not change for a particular transformation in the preferred embodiment, those values need to be computed only once. In this manner the number of computations required to transform a raster image is reduced from four multiplications and two additions to just two additions.

The description with reference to FIG. 1 describes a method of image transformation that is known in the art as forward mapping. In other words, the pixels in the source image are mapped onto the pixels in the destination image. There are limitations to forward mapping, in that when the source and destination images are not in continuous domains, but rather in discrete domains, holes and overlapping can occur in the destination image. Holes and overlapping are well known in the art. Therefore, in the preferred embodiment, inverse mapping is utilized. With inverse mapping, the pixels in the destination image are mapped back onto the pixels in the source image.

Figure 2:
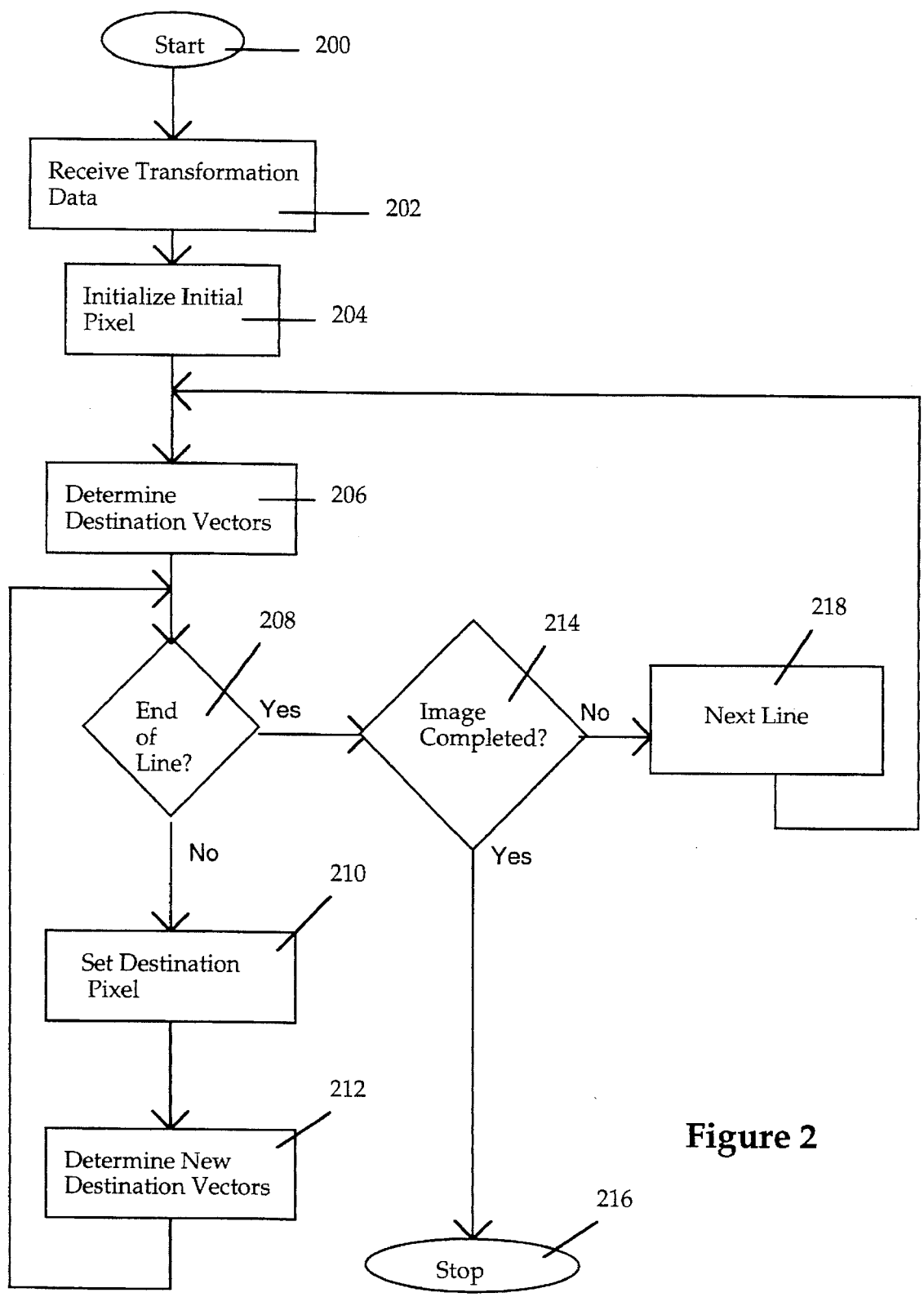
FIG. 2 is a flowchart that illustrates a preferred method for arbitrary transformation of images according to the present invention.

FIG. 2 is a flowchart illustrating a preferred method for arbitrary transformation of images according to the present invention. In the preferred embodiment, the method is implemented prior to an image being rendered into a frame buffer. The method begins a block 200, with a source image to be supplied by a user or application program. A destination image will be stored in a memory. Block 202 illustrates the step of receiving the transformation data. The transformation data defines the type of transformation to be performed on an image, examples being scaling and rotation.

Next, an initial pixel in the destination image is initialized, as shown in block 204. This involves setting the variable $x'_0$ and $y'_0$ to the origin position ($x'_0$, $y'_0$) for the initial pixel in the destination image. The destination vectors, $x_{dest}$ and $y_{dest}$, are then calculated, as shown in block 206. In the preferred embodiment, the process of determining the destination vectors begins with computing the inverse of the transformation matrix:

$$\begin{bmatrix} a & b \\ c & d \end{bmatrix} = \begin{bmatrix} A & B \\ C & D \end{bmatrix}^{-1}$$

The destination vectors which correspond to the initial pixel are then determined using the following equations:

$$x = Ax' + By'$$

$$y = Cx' + Dy'$$

Next, a determination is made as to whether or not the end of the raster line has been reached, as shown in block 208. If it is not the end of the raster line, the method continues at block 210 with setting the destination pixel. This involves depositing the pixel at the position (x, y). New destination vectors are then calculated, as shown in block 212. The new destination vectors are determined in this example with $\Delta_x = 1$ using the following equations:

$$x'_{dest} = x_{dest} + A$$

$$y'_{dest} = y_{dest} + C$$

Once the new destination vectors are determined, the method returns to block 208. The method will then cycle through blocks 208–212 until the end of the raster line is reached.

When the end of the raster line is reached, the method passes to block 214, where a determination is made as to whether or not the entire image has been transformed. If the entire image has been transformed, the method ends, as illustrated in block 216. If the entire image has not been transformed, the process moves onto the next raster line. This is accomplished by incrementing y' by $\Delta_y$, i.e., $y' = y' + \Delta_y$. In the preferred embodiment, $\Delta_y$ is a known, fixed value, and can be an integer or a non-integer number. This step is shown in block 218. The method then returns to block 206. The process then cycles through blocks 206–214 until the entire image has been transformed.

As discussed earlier, the preferred method described above performs an inverse mapping from a destination image to a source image. The present invention, however, is not limited to this implementation. The present invention can be used with any image transformation between source and destination images.

And, although the present invention has been described with reference to a two-dimensional image, it is not limited to two dimensions. The present invention can be implemented with any n-dimension images where the two spaces (i.e., source and destination) can be decomposed into linear rays. In the preferred embodiment, these linear rays are raster scans in a two dimensional plane.

Furthermore, term "image" has been used with reference to a two-dimensional data. The present invention, however, is not limited to this type of data organization. The present invention can be used with any data that can undergo linear transformations, where the data is stored, retrieved or transmitted in an ordered manner.

Figure 3A:
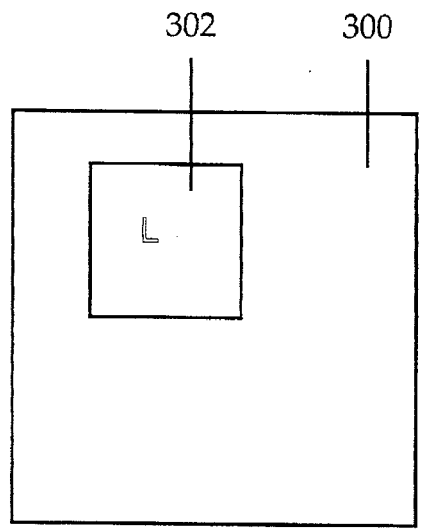
FIGS. 3a–3d depicts a pictorial representation of different types of image processing operations.
Figure 3B:
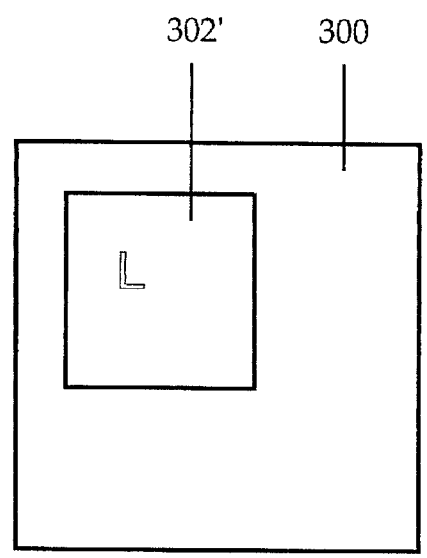

Referring to FIGS. 3a–3d, pictorial representations of different types of image processing operations that can be performed using the present invention are depicted. FIG. 3a illustrates a display 300 displaying a source image 302. One type of operation that can be performed according to the present invention is scaling. Scaling can enlarge or reduce an image. FIG. 3b depicts a destination image 302' as an enlargement of source image 302. For scaling, the variables b and d are zero while the variables a and c equal some number. For example, if the variables a and c are set at 2, the source image is scaled by a factor of 2.

Figure 3C:
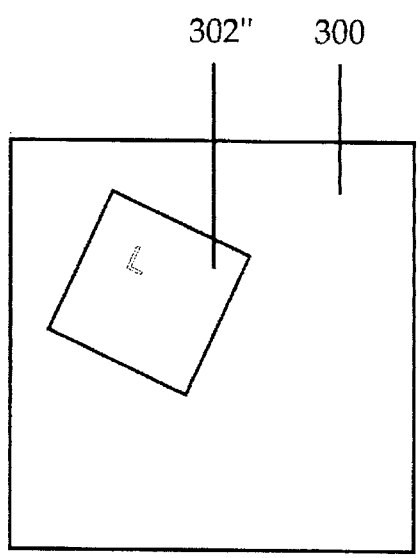

Rotation is another image processing operation that can be performed according to the present invention. FIG. 3c illustrates a destination image 302'' as source image 302 rotated by a particular number of degrees. For example, to rotate the source image by 45 degrees, the variables a, b, c, d are set to a=b=d=0.707 and c=−0.707.

Figure 3D:
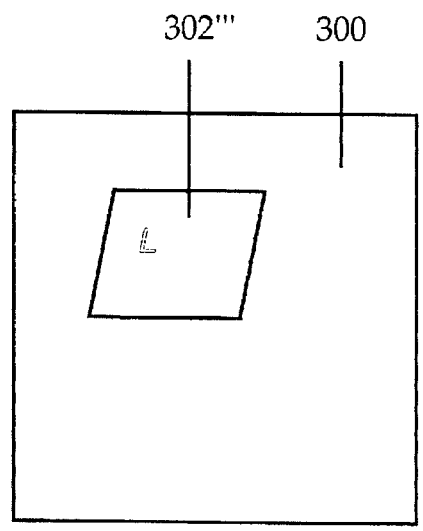

Finally, an image can be skewed using the present invention. FIG. 3d depicts a destination image 302''' as source image 302 skewed by a particular amount. For example, to skew source image 302 in the x direction, variables a and d equal 1 while b equals a number and c equals 0. Alternatively, to skew source image 302 in the y direction, variables a and d equal 1 while c equals a number and b equals 0.

Figure 4:
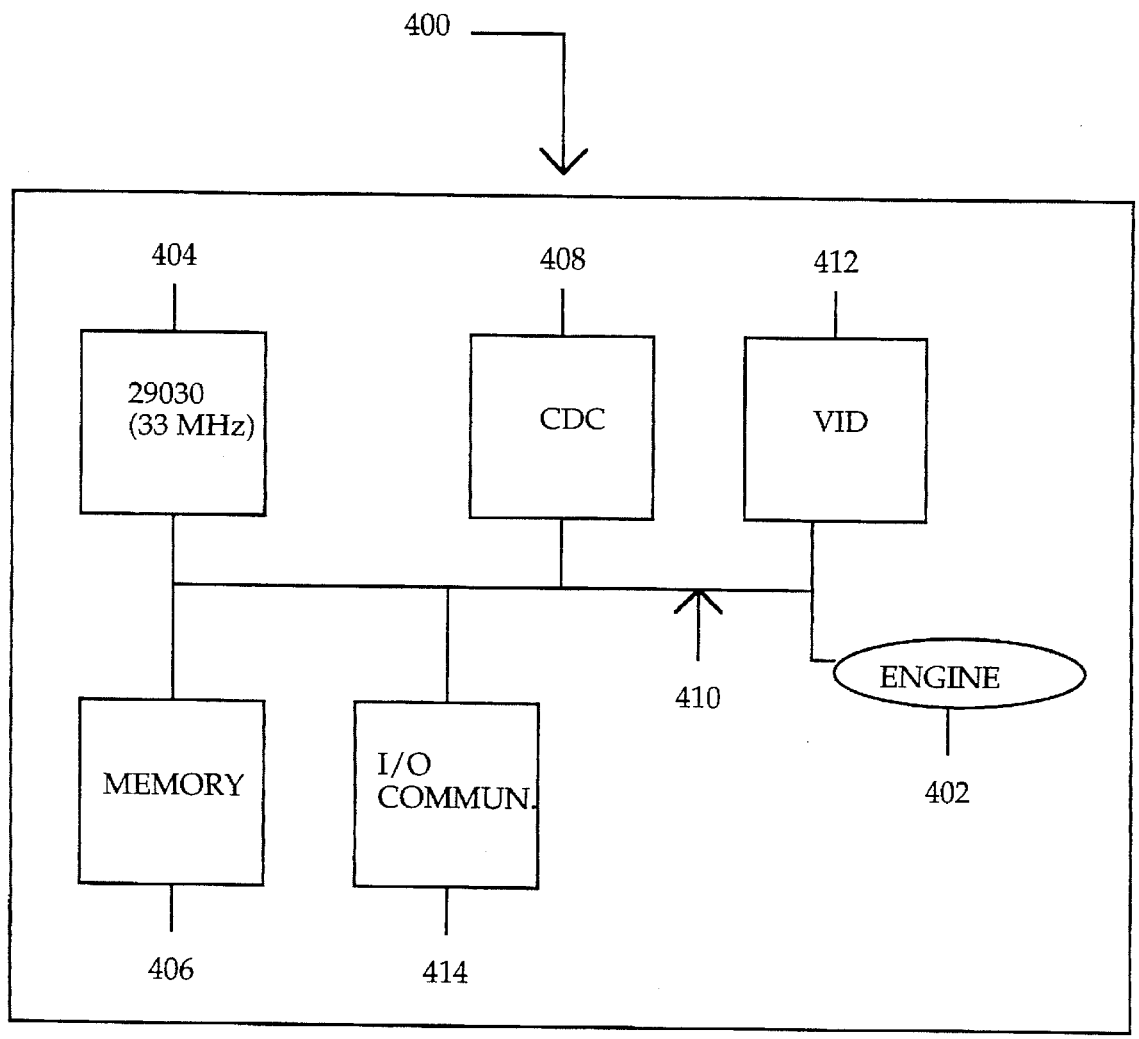
FIG. 4 is a high level block diagram of a preferred apparatus that can be used to implement the preferred method for arbitrary transformation of images according to the present invention.

FIG. 4 is a high level block diagram of a preferred apparatus that can be used to implement the preferred method for arbitrary transformation of images according to the present invention. Printing system 400 includes a color laser engine 402, such as any commercially available color laser marking engine. For purposes of the following discussion, the term "color" includes the use of multiple colors (such as cyan, magenta, and yellow), as well as gray scale printing using varying shades of gray.

Printing system 400 further includes a processor, represented in FIG. 4 as printing system controller 404 having associated memory 406. Printing system controller 404 can be a reduced instruction set computer (RISC) such as the 33 Megahertz 29030 processor available from Advanced Micro Devices. Printing system controller 404 performs such functions as scaling, partitioning, resampling, and filtering in the preferred embodiment. Thus, the method for arbitrary transformation of images is performed by printing system controller 404 in the preferred embodiment.

Printing system 400 also includes a compression/decompression coprocessor (CDC) 408. CDC coprocessor 408 compresses image data in order to substantially reduce the memory requirements needed to store image data. However, if cost is not a concern, CDC coprocessor 408 can be left out completely in a color printing system. CDC coprocessor 408 can, for example, be formed as a monolithic application specific integrated circuit (ASIC). Those skilled in the art, however, will appreciate that the processing implemented by CDC coprocessor 408 can be performed by the same processor for printing system controller 404.

Once image data is compressed and stored in memory by CDC coprocessor 408, it can subsequently be transferred to printer engine 402 via system bus 410 and video interface device (VID) 412. VID 412 provides high quality reproduction of the original image from its compressed format. VID 412 may, for example, be formed as a separate ASIC having a decompression processor to support decompression and halftoning. Alternatively, a single processor can be used to implement the functions of printing system controller 404, CDC coprocessor 408, and VID 412.

Printing system 400 further includes an input/output (I/O) communications device 414. I/O communications device 414 may include, for example, built-in networking support as well as parallel/serial I/O ports. I/O communications device 414 can also include additional memory as well as memory expansion ports.

One of the advantages of the present invention is that it reduces the number of computations required to transform an image from four multiplications and two additions to just two additions. This means the process for transforming images is faster. Another advantage to the present invention is its flexibility and wide applicability. It can be used for a variety of image processing operations, such as scaling, rotation, skewing, and creating perspective views.

While the invention has been particularly shown and described with reference to a preferred embodiment, it will be understood by those skilled in the art that various changes in form and detail may be made therein without departing from the spirit and scope of the invention. For example, the calculations described with reference to FIG. 1 are not limited to only calculations in the x-direction. The same calculations can be done for transformations in the y-direction, when the next pixel to be transformed is located at $(x_0, y_0+\Delta_y)$.

Furthermore, the present invention can be implemented in hardware, software, or a combination of hardware and software. With regard to the source and destination images, they do not have to reside in a memory. One alternative implementation is to generate the source image in a digital camera that is arbitrarily addressable and the destination image could be a digital communications channel. The source and destination images are also not limited to monochrome or color images of precisely three components. Finally, the present invention can be used with a matrix transformation that does not contain a translation term within the matrix transformation.

What is claimed is:

1. A method for transforming a scan line in a first image into a second image, wherein the scan line in the first image is comprised of at least one pixel, said method comprising the steps of:

receiving transformation data, wherein the transformation data defines the type of transformation to be performed on the scan line in first image;

determining an initial pixel location in the scan line in the first image;

determining at least one initial destination vector using the transformation data and the initial pixel location;

determining a pixel location in the second image using the at least one initial destination vector;

determining a first value, wherein the first value remains constant throughout the transformation of the scan line in the first image;

determining a second value, wherein the second value remains constant throughout the transformation of the scan line in the first image;

for each remaining pixel in the scan line in the first image, determining at least one destination vector for each remaining pixel using the first and second values and the at least one initial destination vector; and for each remaining pixel in the scan line in the first image, determining a pixel location in the second image by using the at least one destination vector determined for each remaining pixel.

2. The method of claim 1, wherein the scan line in the first image is a raster scan line.

3. The method of claim 1, wherein the first image is a destination image and the second image is a source image, and wherein the method for transforming the scan line in the first image into the second image uses inverse mapping.

4. The method of claim 1, wherein the first image is a source image and the second image is a destination image, and wherein the method for transforming the first image into the second image uses forward mapping.

5. The method of claim 1, wherein the at least one initial destination vector is defined by the equation $$\begin{bmatrix} x'_0 \\ y'_0 \end{bmatrix} = \begin{bmatrix} a & b \\ c & d \end{bmatrix} \begin{bmatrix} x_0 \\ y_0 \end{bmatrix},$$

where $x_0$ and $y_0$ define the initial pixel location in the first image, a, b, c and d comprise the transformation data, and $x'_0$ and $y'_0$ define a pixel location in the second image.

6. The method of claim 5 wherein the at least one destination vector is defined by the equation $$\begin{bmatrix} x' \\ y' \end{bmatrix} = \begin{bmatrix} a & b \\ c & d \end{bmatrix} \begin{bmatrix} x_0 \\ y_0 \end{bmatrix} + \begin{bmatrix} a & b \\ c & d \end{bmatrix} \begin{bmatrix} \Delta_x \\ 0 \end{bmatrix}$$

where $\Delta_x$ is a known, fixed value, and x' and y' define a pixel location in the second image.

7. The method of claim 6, where $\Delta_x$ is a known, fixed integer value.

8. The method of claim 1, further comprising the step of incrementing to the next scan line in the first image and repeating the steps in claim 1 until all of the scan lines in the first image have been transformed.

9. An image processing apparatus for transforming a scan line in a first image into a second image, wherein the scan line in the first image is comprised of at least one pixel, said image processing apparatus comprising:

means for receiving transformation data, wherein the transformation data defines the type of transformation to be performed on the scan line in the first image;

means for determining an initial pixel location in the scan line in the first image;

means for determining at least one initial destination vector using the transformation data and the initial pixel location;

means for determining a pixel location in the second image using the at least one initial destination vector;

means for determining a first value, wherein the first value remains constant throughout the transformation of the scan line in the first image;

means for determining a second value, wherein the second value remains constant throughout the transformation of the scan line in the first image;

for each remaining pixel in the scan line in the first image, means for determining at least one destination vector for each remaining pixel using the first and second values and the at least one initial destination vector; and for each remaining pixel in the scan line in the first image, means for determining a pixel location in the second image using the at least one destination vector determined for each remaining pixel.

10. The apparatus of claim 9, wherein the first image is a destination image and the second image is a source image, and wherein the method for transforming the first image into the second image uses inverse mapping.

11. The apparatus of claim 9, wherein the first image is a source image and the second image is a destination image, and wherein the method for transforming the first image into the second image uses forward mapping.

12. The apparatus of claim 9, wherein the scan line in the first image is a raster scan line.

13. A method for transforming a first image into a second image, wherein the first and second images are comprised of at least one scan line comprised of at least one pixel, said method comprising the steps of:

receiving transformation data, wherein the transformation data defines the type of transformation to be performed on the first image;

determining an initial pixel location in an initial scan line in the first image;

determining at least one initial destination vector using the transformation data and the initial pixel location;

determining a pixel location in the second image using the at least one initial destination vector;

making a determination as to whether each pixel in the initial scan line has been transformed;

if each pixel in the initial scan line has not been transformed:

determining a first value and a second value, wherein the first value and the second value remain constant throughout the transformation of the initial scan line in the first image; and for each remaining pixel in the initial scan line, determining at least one destination vector to define a pixel location in the second image using the at least one initial destination vector and the first and second values;

if each pixel in the initial scan line has been transformed, making a determination as to whether there is at least one additional scan line in the first image that needs to be transformed; and if there is at least one additional scan line in the first image that needs to be transformed, for each scan line remaining:

incrementing to the next scan line;

determining at least one new initial destination vector using the initial pixel location and the transformation data;

determining a pixel location in the second image using the at least one new initial destination vector; and for each pixel in the next scan line, determining at least one new destination vector to define a pixel location in the second image using the at least one new initial destination vector and the first and second values.

14. The method of claim 13, wherein the scan line in the first image is a raster scan line.

15. The method of claim 13, wherein the first image is a destination image and the second image is a source image, and wherein the method for transforming the first image into the second image uses inverse mapping.

16. The method of claim 13, wherein the first image is a source image and the second image is a destination image, and wherein the method for transforming the first image into the second image uses forward mapping.

17. The method of claim 13, wherein the at least one initial destination vector is defined by the equation $$\begin{bmatrix} x'_0 \\ y'_0 \end{bmatrix} = \begin{bmatrix} a & b \\ c & d \end{bmatrix} \begin{bmatrix} x_0 \\ y_0 \end{bmatrix},$$

where $x_0$ and $y_0$ define the initial pixel location in the first image, a, b, c and d comprise the transformation data, and $x'_0$ and $y'_0$ define a pixel location in the second image.

18. The method of claim 17, wherein the at least one destination vector is defined by the equation $$\begin{bmatrix} x' \\ y' \end{bmatrix} = \begin{bmatrix} a & b \\ c & d \end{bmatrix} \begin{bmatrix} x_0 \\ y_0 \end{bmatrix} + \begin{bmatrix} a & b \\ c & d \end{bmatrix} \begin{bmatrix} \Delta_x \\ \Delta_y \end{bmatrix}$$

where $\Delta_x$ is a known, fixed value, $\Delta_y$ is a known fixed value, and x' and y' define a pixel location in the second image.

19. The method of claim 18, where $\Delta_x$ is a known, fixed integer value and $\Delta_y$ is a known fixed integer value.

\* \* \* \* \*